(12) United States Patent
Nazarowski

(10) Patent No.: US 11,100,528 B2
(45) Date of Patent: Aug. 24, 2021

(54) SYSTEM AND METHOD FOR IMPLEMENTING A TRUSTED IDENTITY BROKER SOLUTION TO PROTECT CUSTOMER IDENTITY

(71) Applicant: JPMorgan Chase Bank, N.A., New York, NY (US)

(72) Inventor: Tony M. Nazarowski, Elgin, IL (US)

(73) Assignee: JPMorgan Chase Bank, N.A., New York, NY (US)

( * ) Notice: Subject to any disclaimer, the term of this patent is extended or adjusted under 35 U.S.C. 154(b) by 274 days.

(21) Appl. No.: 16/190,830

(22) Filed: Nov. 14, 2018

(65) Prior Publication Data

US 2019/0147477 A1    May 16, 2019

Related U.S. Application Data

(60) Provisional application No. 62/585,670, filed on Nov. 14, 2017.

(51) Int. Cl.
| | |
|---|---|
| *G06Q 30/00* | (2012.01) |
| *G06Q 30/02* | (2012.01) |
| *G06F 21/62* | (2013.01) |
| *G06Q 20/40* | (2012.01) |
| *G06Q 30/06* | (2012.01) |

(52) U.S. Cl.
CPC ..... *G06Q 30/0226* (2013.01); *G06F 21/6245* (2013.01); *G06Q 20/4014* (2013.01); *G06Q 30/0213* (2013.01); *G06Q 30/0239* (2013.01); *G06Q 30/0601* (2013.01)

(58) Field of Classification Search
CPC .......... G06Q 30/0226; G06Q 30/0239; G06Q 20/4014; G06Q 30/0601; G06Q 20/32; G06F 21/6245; H04L 2209/56; H04L 2463/102; H04W 12/02
See application file for complete search history.

(56) References Cited

U.S. PATENT DOCUMENTS

| | | | | |
|---|---|---|---|---|
| 8,417,633 B1 * | 4/2013 | Chmara | ............... | G06Q 20/202 |
| | | | | 705/40 |
| 9,792,596 B2 * | 10/2017 | Craft | ................... | G06Q 30/0234 |
| 2008/0319914 A1 * | 12/2008 | Carrott | ............. | G06Q 20/38215 |
| | | | | 705/75 |
| 2010/0125510 A1 * | 5/2010 | Smith | .................. | G06Q 20/105 |
| | | | | 705/17 |
| 2011/0307318 A1 * | 12/2011 | LaPorte | ............. | G06Q 30/0207 |
| | | | | 705/14.33 |

(Continued)

*Primary Examiner* — Luis A Brown
(74) *Attorney, Agent, or Firm* — Hunton Andrews Kurth LLP

(57) ABSTRACT

The invention relates to a trusted identity broker system to protect customer personal information and monetize direct marketing. According to an embodiment of the present invention, the innovative trusted identity broker solution receives a customer identifier and a merchant specific code via the customer mobile application from the customer responsive to a customer transaction request; generates a customer token that defines a customer-merchant relationship; transmits the customer token to the merchant entity; receives customer authorization from the merchant entity; and transmits authorization to the customer mobile application to effectuate the customer transaction request.

20 Claims, 3 Drawing Sheets

(56) References Cited

U.S. PATENT DOCUMENTS

| | | | |
|---|---|---|---|
| 2012/0221952 A1* | 8/2012 | Chavez | H04N 21/8126 |
| | | | 715/733 |
| 2012/0222069 A1* | 8/2012 | Chavez | H04N 21/47 |
| | | | 725/37 |
| 2012/0311162 A1* | 12/2012 | Paulsen | H04L 67/02 |
| | | | 709/227 |
| 2013/0238455 A1* | 9/2013 | Laracey | G06Q 20/108 |
| | | | 705/21 |
| 2014/0149291 A1* | 5/2014 | Bercaw | G06Q 30/0601 |
| | | | 705/44 |
| 2015/0012660 A1* | 1/2015 | Kuulusa | H04L 65/4092 |
| | | | 709/231 |
| 2016/0232515 A1* | 8/2016 | Jhas | G06Q 30/06 |
| 2016/0321664 A1* | 11/2016 | Erickson | G06Q 20/4014 |
| 2017/0236118 A1* | 8/2017 | Laracey | G06Q 20/3674 |
| | | | 705/44 |
| 2018/0137512 A1* | 5/2018 | Georgiadis | H04L 9/3239 |
| 2018/0174137 A1* | 6/2018 | Subbarayan | G06Q 20/12 |
| 2018/0253718 A1* | 9/2018 | Khan | G06Q 30/0226 |
| 2018/0268395 A1* | 9/2018 | Donk | G06Q 20/325 |
| 2019/0147477 A1* | 5/2019 | Nazarowski | H04L 9/3213 |
| | | | 705/14.27 |
| 2019/0156388 A1* | 5/2019 | Quentin | G06F 21/6254 |
| 2019/0364426 A1* | 11/2019 | Muthukrishnan | B60R 13/10 |
| 2020/0219125 A1* | 7/2020 | Das | G06Q 30/06 |

* cited by examiner

| Merchant | Newsletter | Weekly Promotions | Fraud Alerts |
|---|---|---|---|
| Tony's Shoes | Mute | Mute | Yes - Email |
| Candle Shop | Yes – App | Yes – App | Yes – App |
| Mind TV | Yes – Email | Mute | Yes – App |

Communication Interface 300

Figure 3

SYSTEM AND METHOD FOR IMPLEMENTING A TRUSTED IDENTITY BROKER SOLUTION TO PROTECT CUSTOMER IDENTITY

CROSS REFERENCE TO RELATED APPLICATIONS

The application claims priority to U.S. Provisional Application 62/585,670, filed Nov. 14, 2017, the contents of which are incorporated herein in its entirety.

FIELD OF THE INVENTION

The invention relates generally to a system and method for implementing a trusted identity broker solution to protect customer personal information and monetize direct marketing.

BACKGROUND OF THE INVENTION

Customers expose, or volunteer, too much personally identifiable information (PII) when doing business with a new merchant or provider. For instance, when a consumer visits a doctor for the first time, they are required to disclose financial and personal information, including social security number and credit card information, to an administrative clerk. When in the wrong hands, this information can be captured and used for nefarious purposes. Similarly, when a consumer buys an item from a merchant in a shopping mall, the consumer may be offered a great discount that day if the consumer signs up for a special rewards program. Doing so requires the consumer to provide their PII (e.g., e-mail address, home mailing address, date of birth, etc.). The same is true when a consumer makes a purchase from an on-line merchant. Once a consumer provides their PII to the merchant, the merchant starts bombarding the consumer unwanted e-mail communications and uses the PII information in ways that do not serve the best interest of the consumer. In addition, some consumers may simply choose not to read emails from merchants and oftentimes even provide an alternative email that they only use for initial sign-ups. The collection of the PII by an untrusted source (e.g., merchant, provider, etc.) leaves the consumer exposed and subject to identity theft as there is no chain-of-custody for the PII exchange.

These and other drawbacks exist.

SUMMARY OF THE INVENTION

According to one embodiment, the invention relates to a system that implements a Trusted Identity Broker solution. The trusted identity broker system comprises: a first communication interface that communicates to a customer via a customer mobile application on a mobile device; a second communication interface that communications with a merchant entity; and a processor, coupled to the first communication interface and the second communication interface, configured to perform the steps comprising: receiving a customer identifier and a merchant specific code via the customer mobile application from the customer responsive to a customer transaction request; generating a customer token that defines a customer-merchant relationship; transmitting the customer token to the merchant entity; receiving customer authorization from the merchant entity; and transmitting authorization to the customer mobile application to effectuate the customer transaction request.

According to another embodiment, the invention relates to a method that implements a trusted identity service. The method comprises the steps of: receiving, via a first communication interface, a customer identifier and a merchant specific code via a customer mobile application from the customer responsive to a customer transaction request; generating a customer token that defines a customer-merchant relationship; transmitting, via a second communication interface, the customer token to the merchant entity; receiving, via the second communication interface, customer authorization from the merchant entity; and transmitting, via the first communication interface, authorization to the customer mobile application to effectuate the customer transaction request.

The system may include a specially programmed computer system comprising one or more computer processors, interactive interfaces, electronic storage devices, and networks.

The computer implemented system, method and medium described herein provide unique advantages to entities, organizations and other users, according to various embodiments of the invention. The innovative system and method provide significant business benefits for customers and merchants in safeguarding and protecting customer personal information. The customer is able to engage in a safe and secure way of signing up with a merchant without having to share personal and confidential information. The merchant is provided a communication channel with a higher probability that the message will be received, viewed and acted upon by the customer. The various embodiments of the present invention also realizes direct marketing opportunities. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

FIG. 3 is an exemplary screenshot of a Customer Communication Control interface, according to an embodiment of the present invention.

DETAILED DESCRIPTION OF THE PREFERRED EMBODIMENT(S)

Figure 1:
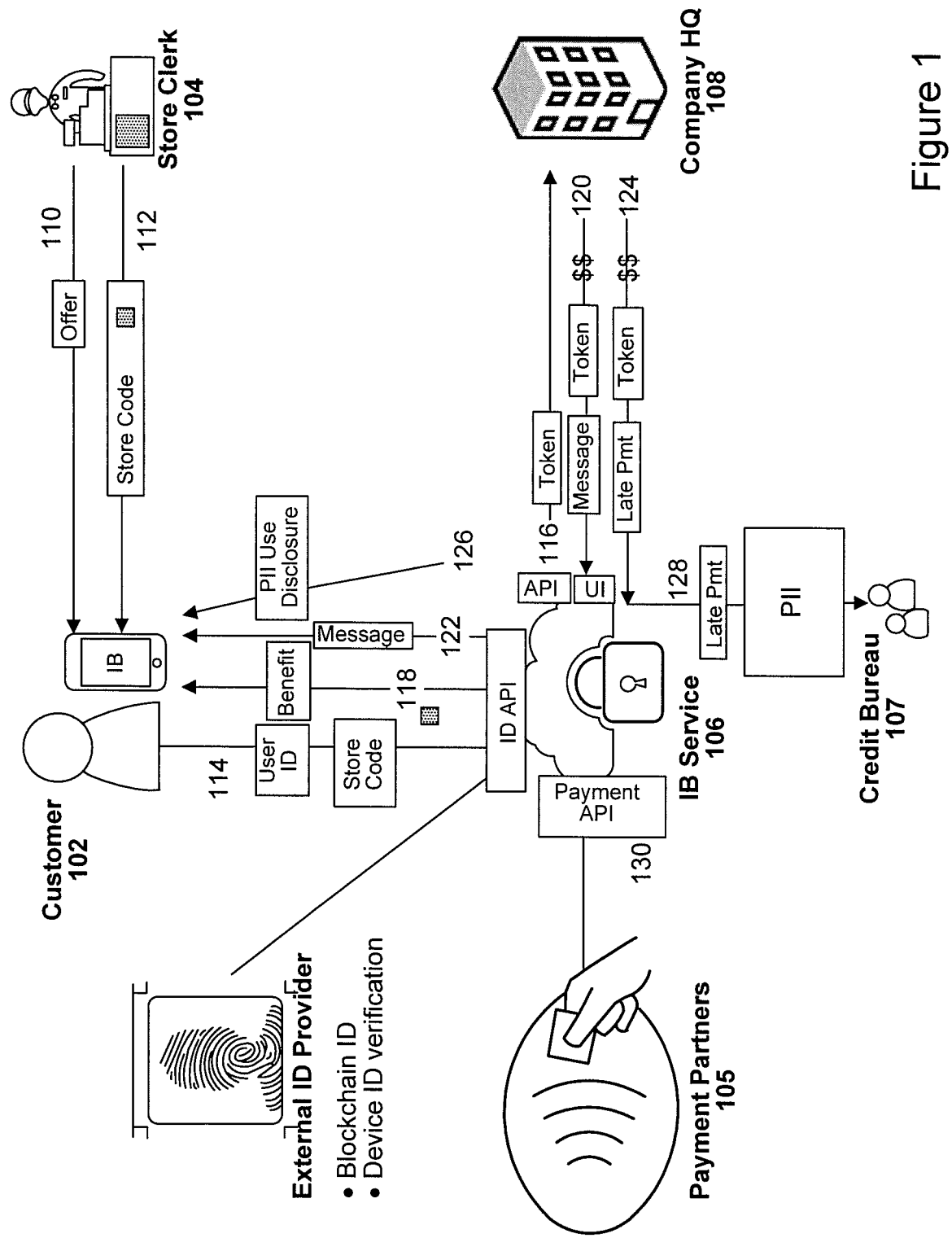
FIG. 1 is an exemplary system diagram of an identity broker solution, according to an embodiment of the present invention.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to an innovative trusted Identity Broker (IB) solution of personally identifiable information (PII) information. This may be referred to as a PII Clearinghouse or PII Proxy. An Identity Broker (IB) Service of an embodiment of the present invention serves the interest of the customer by acting as an intermediary and further gives customers and merchants control over direct marketing engagements.

According to an embodiment of the present invention, a customer may enter a relationship with a merchant by providing a code, such as a hash code, to a merchant (instead of actual real PII data). For example, during enrollment in a rewards loyalty program at a merchant store or an online website, the customer avoids having to provide name, mailing address, cell phone number to the new merchant. Instead, with an embodiment of the present invention, the customer may access a mobile application (via a mobile device) and enter a merchant code or identifier for the merchant store. In this example, the merchant is a participant in an IB Service of an embodiment of the present invention. The customer may then receive a one-time hash code (e.g., a six digit number, etc.) that may be disclosed to the merchant. The merchant in turn may then enter or receive the hash code (e.g., six digit number in this example) and verify that the customer is legitimate and in good standing. Other codes, including QR (Quick Response) codes, identifiers, etc., may be implemented. The merchant may receive, from the IB Service, an approval message confirming the customer has valid PII data on record and the customer is linked to a known valid banking account (e.g., credit card, checking account, savings account, investment account, etc.). Other qualifications may be considered (e.g., valid account with no late fees during the last 6 months, active customer, etc.). The electronic exchange may happen in several different ways.

After this point, the merchant would not have the customer's PII data on file. According to an embodiment of the present invention, when the merchant needs to access the customer information (e.g., direct marketing, report to a credit bureau), the merchant may request the information through the IB Service of an embodiment of the present invention. The customer benefits from this service because the PII data is well protected. Moreover, there is a chain-of-custody to track the disclosure of their PII information. The merchant benefits from this relationship because they know the customer data is valid and/or verified. The merchant is also relieved of the burden of having to store and protect sensitive customer data.

An embodiment of the present invention may provide Direct Marketing opportunities. For example, an embodiment of the present invention may be applied to retail and on-line transactions. When a customer enters a brick-and-mortar store or when the customer signs up for an account with an on-line merchant, the merchant may request contact information from the customer. In particular, the merchant may request a mobile phone number, an email address as well as other personal information.

Traditionally, the customer may sign up for a rewards program to receive an immediate discount. However, the customer is then bombarded with email messages and other notifications from other sources, including other merchants, vendors, and service providers, as well. Through the IB Service of an embodiment of the present invention, instead of volunteering PII data (e.g., customer contact data, home address, phone number, e-mail address), the customer may provide a code (e.g., hash code, etc.) to the merchant. In doing so, the customer only allows certain information (e.g., e-mail address) to be disclosed to the particular merchant.

According to another scenario, instead of a merchant making direct contact with a customer via e-mail or other communication, the merchant may send communications through the IB Service, which becomes a proxy for the customer. For example, when the merchant wants to send a marketing message to a new customer, the merchant may send the message through the IB Service. Therefore, each time the customer is contacted, the merchant may be required to pay the IB Service a small payment (e.g., a fraction of a penny, etc.). For the merchant, by going through the IB Service, the merchant has assurances that the customer is a legitimate customer in good standing. For example, the merchant may be assured that the customer's identity is linked to a valid credit card and that credit card is linked to other valid transactions. Other qualifications and/or requirements may be applied. The merchant may also receive confirmation that the e-mail address provided is a legitimate and valid email address (and not one that is associated with a customer's junk email).

Accordingly, the customer is able to engage in a safe and secure way of signing up with a merchant without having to share personal and confidential information that may be later shared and abused without the customer's knowledge and/or permission. In addition, there is an increased probability that the customer will receive the message, view the message and further act upon the message. Other benefits and advantages include improved market penetration by leveraging existing relationships with merchants and payment channels. In addition, financial institutions (or other providers) may be better positioned to provide a value added service of identity protection for their customers. In doing so, the financial institution may better monetize marketing transactions, thereby generating revenue and opportunities from advertisements.

FIG. 1 is an exemplary system diagram of an identity broker solution, according to an embodiment of the present invention. An embodiment of the present invention is directed to providing an Identity Broker ("IB") service to protect the identity of its customers while introducing a new revenue stream. Customer 102 may interface with vendors and merchants, represented by 104, through a tokenized identity. And, subsequent communications may go through an IB Service, represented by 106. While the flow of FIG. 1 illustrates certain steps performed in a particular order, it should be understood that the embodiments of the present invention may be practiced by adding one or more steps to the processes, omitting steps within the processes and/or altering the order in which one or more steps are performed.

As shown in FIG. 1, Customer 102 may interact with Store Clerk 104. The interaction may be in person at a merchant store or online and further represents various types of transactions. At step 110, Store Clerk offers a benefit to Customer. For example, Store Clerk 104 may offer a discount, such as 15% off today, if the customer signs up for a program, such as joining a rewards club, signing up for a credit card, etc. At step 112, Customer 102 may receive a store code with a corresponding application on a mobile device. Customer 102 may scan a code, such as a QR code, using near field communication (NFC) technology, and/or complete a purchase with payment card. An embodiment of the present invention may be directed to integration with a card swipe. In this example, a customer may swipe a payment card at a point of sale, or otherwise interact with a point of sale device or other payment terminal. The customer may elect to receive a receipt via email. During this interaction, the customer may join a loyalty program without having to provide detailed PII data, such as name, address, etc. The merchant may pass the customer interaction to IB Service 106 for verification and enrollment.

At step 114, the IB application may send a customer ID and store the code to a IB Service 106. At step 116, IB Service 106 may generate and send a Customer token to Company Headquarters (HQ) as shown by 108. Company HQ may represent a merchant entity, affiliates, subsidiaries, providers and/or partners. This token may represent a one-time code defining and/or establishing a customer-merchant relationship. At step 118, IB Service 106 may send a benefit to Customer 102. For example, the benefit may represent a 15% off code as part of an enrollment in a rewards program. With an embodiment of the present invention, a customer may participate in a merchant program without having to provide any personal information to the merchant.

Another embodiment of the present invention is directed to enabling a customer to have control over merchant initiated communications. At step 120, a Merchant (through Company HQ 108) may request to send a correspondence to Customer 102. The correspondence may include direct marketing opportunities. In this example, Merchant may send IB Service 106 the customer token, the message, and a transaction processing fee. Other arrangements may be applied. At step 122, IB Service 106 may send the correspondence to Customer 102. According to an embodiment of the present invention, Customer 102 may have a set of preferences over the type of messages and modes of communication by which a merchant may communicate with the customers. A message may appear in a IB application executing on a mobile device and any other format the customer selects (e.g., e-mail, short message service (SMS), etc.) in accordance with the customer's preferences. By providing this type of control, customers may be less likely to ignore messages from merchants that fit the customer's preferences. With an embodiment of the present invention, a merchant may communicate messages to a customer in a manner that increases a likelihood that the customer will receive and act on the message.

Another embodiment of the present invention may be applied to a Credit Reporting scenario. At step 124, Merchant (through Company HQ 108) may send a delinquency report request to IB Service 106. The Merchant may send a customer token, details of the delinquency, and a transaction processing fee to IB Service 106. At step 128, IB Service 106 may pass a delinquency report to Credit Bureau 107. IB Service 106 may pass the delinquency detail with customer PII data to the Credit Bureau 107. At step 126, IB Service 106 may send a disclosure notice to Customer 102. In addition, whenever an entity requests to use the customer PII data, or when it is actually is used, the customer may be notified through IB Service 106. Other notifications, settings and/or preferences may be applied by the customer.

As shown in FIG. 1, IB Service 106 may also support an External ID provider and various payment partners as well, represented by Payment Partners 105. An embodiment of the present invention may connect with external ID sources. At the discretion of the customer, Payment Partners 105 may link their identity to an external ID source. This option may include, but is not limited to, an open-ledger identity using Block chain. For example, by default, a customer's identity may be tethered to a financial account at Bank A. When the customer interacts with the IB Service, an embodiment of the present invention may recognize the customer because this customer has a checking with Bank A and two active credit cards. In addition to connecting the customer's identity to financial accounts, an embodiment of the present invention may further tether the customer's identity to a Block chain based identity. In that case, the customer may be recognized by associated accounts and financial product as well as a Block chain identity.

According to an embodiment of the present invention, IB Service 106 may inform a merchant (vendor or other authorized requester) that the customer has a valid account in good standing with a financial institution. IB Service 106 may offer a level of credibility concerning the customer's identity when dealing with a merchant. In addition, IB Service 106 may indicate that the customer is further tethered to a Block chain identity that may be verified. This provides a further level of assurance to the merchant. The information communicated may be in various formats, including a binary "valid" or "invalid" rating. According to another embodiment, the information may include varying levels of detail and/or insight that may resemble a mini credit rating. The information may also include a credibility ranking (e.g., numerical index, score, color code, representative icon, etc.). Other information may include a fraud risk score, last confirmed transaction date, type of customer (e.g., new customer, high net worth client, etc.) as well as other financial data.

Another embodiment of the present invention is directed to payment integration. Using an open API, shown by Payment API 130, an embodiment of the present invention may offer integration with selected payment partners, as shown by 105. In this scenario, an offer or promotion may be associated with a payment transaction. The vendor and the customer may be incentivized to use the innovative system of an embodiment of the present invention. The customer may be offered a secure payment channel to complete the offer, where the merchant may track the response rate with their targeted promotion. For example, to service the accounts receivable business, IB Service 106 may rebate transactions so that the merchant may then be incentivized to route the offer through the IB Service payment system.

An embodiment of the present invention is directed to providing a consumer with the ability to complete a proposed transaction through a desired payment channel. Without this payment-integration option, a merchant may send an offer to "Purchase new shoes, today only, for 20% off." With an embodiment of the present invention, the customer may receive the same offer from the shoe store with an additional option to complete the transaction with a preferred payment mechanism, e.g., a particular credit card or other payment option. In this example, the customer may receive a message such as "Purchase your favorite shoes for 20%, and if you click [here] to pay with Bank A's Credit Card you will receive 25% off."

In this scenario involving a financial institution and a merchant, the financial institution may incentivize the merchant to use a preferred payment channel. For example, the financial institution may charge a fee, such as $0.01 (1 cent), per message sent to the customer. And if the merchant can get 25% of their transactions to go through the financial institution, an additional rebate or incentive may be applied. Other variations and scenarios may be supported.

Another embodiment of the present invention is directed a Loyalty API. An embodiment of the present invention may expose a web site interface (e.g., for smaller merchants) and an API (e.g., for larger merchants), providing customer loyalty features. For example, a small shoe store with five locations may not have the staff or knowledge to manage a customer loyalty program. In this scenario, an embodiment of the present invention may provide basic features and services to small customers that track promotional correspondences with customer buying activities. The Loyalty API may provide the ability to track customer loyalty and promotions through a user interface. For larger merchants who are more likely to manage an in-house loyalty program, an embodiment of the present invention may provide an API providing customer loyalty-related information. Such information may contain, but is not limited to, information such as customer responses to messages, correspondence that resulted in a sale, historical buying patterns as well as other metrics, calculations and/or trends.

Figure 2:
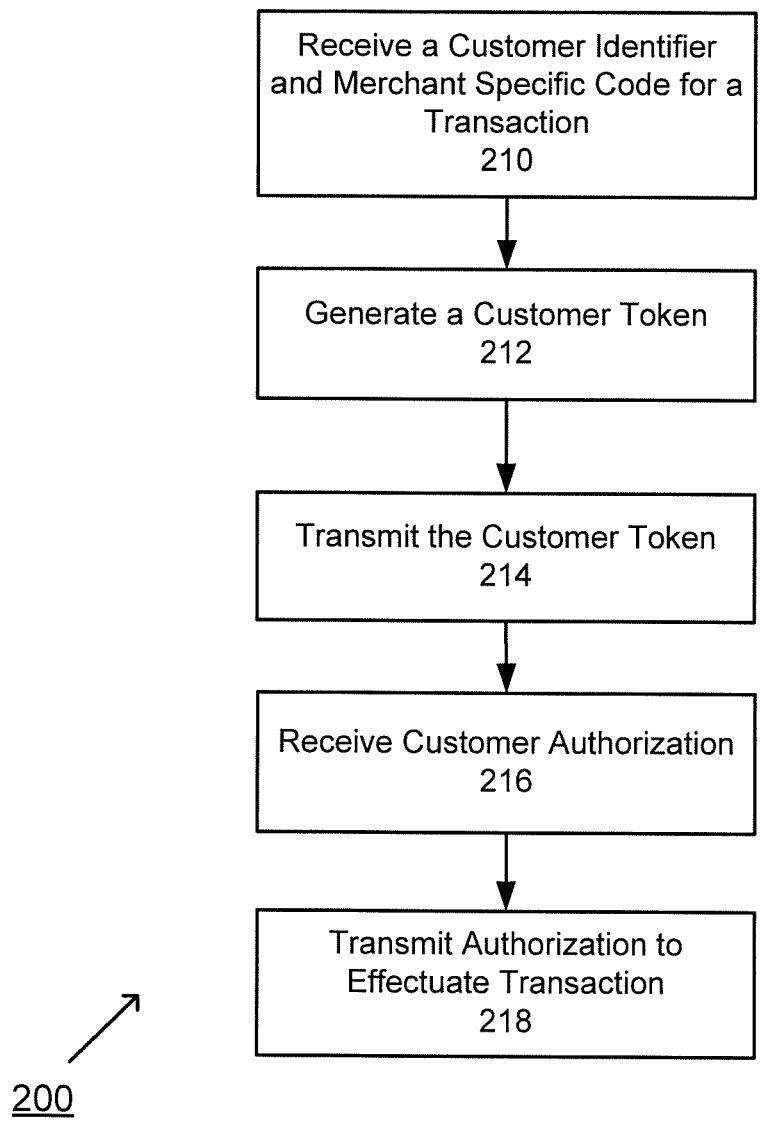
FIG. 2 is an exemplary flow diagram of an identity broken solution, according to an embodiment of the present invention.

FIG. 2 is an exemplary flow diagram of an identity broken solution, according to an embodiment of the present invention. At step 210, a customer identifier and a merchant specific code may be received at a customer interaction with a merchant representative. At step 212, a customer token that defines a customer-merchant relationship may be generated. At step 214, the customer token may be transmitted to a merchant entity. At step 216, customer authorization may be received from the merchant entity. At step 218, an authorization may be transmitted to the customer mobile application to effectuate the customer transaction request with the merchant representative. The order illustrated in FIG. 2 is merely exemplary. While the process of FIG. 2 illustrates certain steps performed in a particular order, it should be understood that the embodiments of the present invention may be practiced by adding one or more steps to the processes, omitting steps within the processes and/or altering the order in which one or more steps are performed. Each step is discussed in further detail below.

At step 210, a customer identifier and a merchant specific code may be received at a customer interaction with a merchant representative. The customer identifier and the merchant specific code may be received via a customer mobile application executing on a customer's mobile device responsive to a customer transaction request. The customer transaction request may involve an in person interaction with a store clerk, merchant terminal, payment interface and/or other merchant representative. The customer interaction request may also occur over an online website. During the interaction, the merchant may present the customer with an offer, such as enrollment in a loyalty program as well as promotion and/or other incentive to be applied to the current transaction. Through the customer mobile application, a merchant specific code may be transmitted to an IB Service.

At step 212, a customer token that defines a customer-merchant relationship may be generated. The customer token may be generated by the IB Service responsive to receiving the customer identifier and the merchant specific code.

At step 214, the customer token may be transmitted to a merchant entity, such as a Company HQ. Responsive to the customer token, the merchant entity may verify that the customer has a valid account and is in good standing. For example, the merchant entity may verify that the customer has a valid credit card and has made at least the minimum balance in the last six months. Other verifications may be made.

At step 216, customer authorization may be received from the merchant entity. The customer authorization may involve receiving a token that verifies the customer to the merchant representative. By verifying the customer, the customer does not need to provide PII to the merchant representative thereby providing safeguards to the customer's PII data.

At step 218, an authorization may be transmitted to the customer mobile application to effectuate the customer transaction request with the merchant representative. This may involve enrolling the customer in a loyalty program.

According to another example, an incentive, discount and/or other benefit may be applied to the current customer interaction.

An embodiment of the present invention is directed to providing a trusted communication channel for a customer. A merchant may seek to communicate with a customer. This may include communicating an offer, benefit, program, information, etc. According to an embodiment of the present invention, the merchant may communicate via a trusted communication channel.

FIG. 3 is an exemplary screenshot of a Customer Communication Control interface, according to an embodiment of the present invention. This feature enables a customer to control how they communicate with a merchant they choose to do business with. On a merchant-by-merchant basis, the customer may determine how they would like to receive correspondences. The settings can be manually set by the user, and they can also be conditional based on volume or other variables. In the exemplary interface shown in FIG. 3, the user may chooses to mute all correspondence with Tony's shoes, but the customer may want to receive a newsletter and promotions from the Candle Shop. Additionally, the user may have advanced settings to mute, or modify these settings if they breach a given threshold (e.g., Mute after 3 updates in a week). Other customer specific preferences may be applied. Other settings may include promotions and/or coupons redeemed, amount saved, savings per merchant. Other features may include partner and/or affiliated merchant offers. For example, a TV merchant my offer deals on smart home devices from an affiliated merchant. Also, the customer's affiliation with Tony's Shoes may lead to a targeted coupon for sneakers from an affiliated shoe company. Other variations may be applied.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, JavaScript and/or Python. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system for implementing a trusted identity service, the system comprising:
   a first communication interface that communicates to a customer via a customer mobile application on a mobile device;
   a second communication interface that communicates with a merchant entity; and
   a processor, coupled to the first communication interface and the second communication interface, configured to perform the steps comprising:
   receiving a customer identifier and a merchant specific code via one or more of scanning a QR code and a nearfield communication in the customer mobile application from the customer responsive to a customer transaction request wherein the customer transaction request is initiated with a credit card swipe;
   generating a customer token, based on the customer identifier and merchant specific code, that defines a customer-merchant relationship and validates the existence and veracity of one or more pieces of personally identifiable information for the customer;
   transmitting the customer token to the merchant entity;
   receiving customer authorization from the merchant entity; and
   transmitting authorization to the customer mobile application to effectuate the customer transaction request.

2. The system of claim 1, wherein the processor is further configured to perform the steps comprising:
   receiving a customer token, a message and a transaction request from the merchant entity; and
   transmitting the message to the customer associated with the customer token to enable the message to display on the customer mobile application.

3. The system of claim 2, wherein the transaction request comprises a transaction fee.

4. The system of claim 1, wherein the customer transaction request occurs at a merchant store location.

5. The system of claim 1, wherein the customer transaction request occurs via an online website.

6. The system of claim 1, wherein the customer authorization verifies that the customer has a valid account and is in good standing.

7. The system of claim 1, wherein the authorization to effectuate the customer transaction request comprises enrollment in a customer loyalty program.

8. The system of claim 1, wherein the authorization to effectuate the customer transaction request comprises a discount to be applied to the customer transaction request.

9. The system of claim 1, wherein the customer identifies one or more preferences that determine how a merchant entity can communicate with the customer.

10. The system of claim 9, wherein the one or more preferences comprise mode of communication and type of communication associated with the merchant entity.

11. A method for implementing a trusted identity service, the method comprising the steps of:
receiving, via a first communication interface, a customer identifier and a merchant specific code via one or more of scanning a QR code and a nearfield communication in a customer mobile application from the customer responsive to a customer transaction request wherein the customer transaction request is initiated with a credit card swipe;
generating a customer token, based on the customer identifier and merchant specific code, that defines a customer-merchant relationship and validates the existence and veracity of one or more pieces of personally identifiable information for the customer;
transmitting, via a second communication interface, the customer token to the merchant entity;
receiving, via the second communication interface, customer authorization from the merchant entity; and
transmitting, via the first communication interface, authorization to the customer mobile application to effectuate the customer transaction request.

12. The method of claim 11, further comprising the steps of:
receiving a customer token, a message and a transaction request from the merchant entity; and
transmitting the message to the customer associated with the customer token to enable the message to display on the customer mobile application.

13. The method of claim 12, wherein the transaction request comprises a transaction fee.

14. The method of claim 11, wherein the customer transaction request occurs at a merchant store location.

15. The method of claim 11, wherein the customer transaction request occurs via an online web site.

16. The method of claim 11, wherein the customer authorization verifies that the customer has a valid account and is in good standing.

17. The method of claim 11, wherein the authorization to effectuate the customer transaction request comprises enrollment in a customer loyalty program.

18. The method of claim 11, wherein the authorization to effectuate the customer transaction request comprises a discount to be applied to the customer transaction request.

19. The method of claim 11, wherein the customer identifies one or more preferences that determine how a merchant entity can communicate with the customer.

20. The method of claim 19, wherein the one or more preferences comprise mode of communication and type of communication associated with the merchant entity.

* * * * *